(12) United States Patent
Russell et al.

(10) Patent No.: US 12,732,054 B2
(45) Date of Patent: Sep. 8, 2026

(54) WOUND ROTOR FOR WIND TURBINE GENERATORS

(71) Applicant: Timken Gears & Services Inc., King of Prussia, PA (US)

(72) Inventors: Randall W. Russell, Kennewick, WA (US); Jan H. de Swardt, Eustis, FL (US)

(73) Assignee: Timken Gears & Services Inc., King of Prussia, PA (US)

( * ) Notice: Subject to any disclaimer, the term of this patent is extended or adjusted under 35 U.S.C. 154(b) by 219 days.

(21) Appl. No.: 18/493,457

(22) Filed: Oct. 24, 2023

(65) Prior Publication Data

US 2024/0154486 A1 May 9, 2024

Related U.S. Application Data

(60) Provisional application No. 63/422,511, filed on Nov. 4, 2022.

(51) Int. Cl.
*H02K 3/51* (2006.01)
*F03D 9/25* (2016.01)
*H02K 7/18* (2006.01)
*H02K 15/50* (2025.01)

(52) U.S. Cl.
CPC ............... *H02K 3/51* (2013.01); *H02K 7/183* (2013.01); *H02K 15/50* (2025.01); *F03D 9/25* (2016.05); *F05D 2220/76* (2013.01); *H02K 2203/09* (2013.01)

(58) Field of Classification Search
CPC .......... H02K 3/51; H02K 7/183; H02K 15/50; H02K 2203/09; F03D 9/25; F05D 2220/76
See application file for complete search history.

(56) References Cited

U.S. PATENT DOCUMENTS 3,312,847 A * 4/1967 Waclaw .................... H02K 7/04 310/43
2013/0328425 A1* 12/2013 Tomita ............... H02K 11/0094 310/71

(Continued)

FOREIGN PATENT DOCUMENTS

EP 3086446 A1 * 10/2016 ............... H02K 3/51

OTHER PUBLICATIONS

Wind Turbine Models, "Vestas V47," <https://web.archive.org/web/20181022035315/https:/en.wind-turbine-models.com/turbines/13-vestas-v47> web page available as least as early as Oct. 22, 2018 (11 pages).

*Primary Examiner* — Tulsidas C Patel
*Assistant Examiner* — Joshua Kiel M Rodriguez
(74) *Attorney, Agent, or Firm* — Michael Best & Friedrich LLP

(57) ABSTRACT

A wound rotor for use in an electric machine. The wound rotor includes a winding overhang portion and a connection ring formed of a plurality of rectangular cross-section conductor sections connected in parallel, the connection ring disposed underneath the winding overhang portion. The wound rotor further includes a first plurality of conductor coils extending from the winding overhang portion and forming a star connection with the connection ring and a second plurality of conductor coils extending from the winding overhang portion to form a line connection.

19 Claims, 14 Drawing Sheets

(56) References Cited

U.S. PATENT DOCUMENTS

| | | | | |
|---|---|---|---|---|
| 2014/0161648 | A1* | 6/2014 | Rose | H02K 15/50<br>417/410.3 |
| 2017/0117769 | A1* | 4/2017 | Kunihiro | F03D 1/06 |
| 2017/0163117 | A1* | 6/2017 | Cho | H02K 3/50 |
| 2022/0278581 | A1* | 9/2022 | Palmer | H02K 3/50 |
| 2022/0278595 | A1* | 9/2022 | Palmer | H02K 3/50 |

* cited by examiner 800
825
845
845
840

WOUND ROTOR FOR WIND TURBINE GENERATORS

CROSS-REFERENCE TO RELATED APPLICATIONS

This application claims priority to U.S. Provisional Patent Application No. 63/422,511, filed Nov. 4, 2022, the entire contents of which are incorporated by reference herein.

BACKGROUND

Wind turbines often include generators that use a wound rotor, also referred to as a slip ring induction generator or DFIG (double fed induction generator), others use wound rotors in synchronous generators, to generate electricity. A wound rotor generator/motor is a machine (e.g., an induction machine) having rotor windings that are connected through slip rings to an external resistance or power source. The speed/torque characteristic of the motor is controllable by modifying the external resistance. When an external power source is connected to the slip rings, the generator can be used to generate different/specific output frequencies—typically used in wind generators.

The electrical characteristics of a wound rotor generator/motor, such as output frequency control, make the wound rotor motor/generator preferable to other types of induction motors/generators (e.g., a squirrel-cage rotor) for electricity generation in a wind turbine. However, deficiencies in the physical construction and installation of various components of a wound rotor result in frequent failures when the wound rotor generator is implemented in a wind turbine. For example, the rotor windings, the winding insulation, and the structures that electrically and physically connect the rotor windings to the rotor leads may be points of structural failure in the face of fatigue stress from normal use in the wind turbine, thereby leading to the need to repair or replace the rotor.

SUMMARY

In one aspect, the invention provides a wound rotor for use in an electric machine. The wound rotor includes a winding overhang portion and a circular connection ring formed of a plurality of rectangular cross-section conductor sections connected in parallel, the connection ring disposed underneath the winding overhang portion. The wound rotor further includes a first plurality of conductor coils extending from the winding overhang portion and forming a star connection with the connection ring and a second plurality of conductor coils extending from the winding overhang portion to form a line connection.

In another aspect, the invention provides a method for constructing a wound rotor for use in an electric machine. The method includes forming a star connection between a plurality of conductor coils and a connection ring, individually wrapping each one of the plurality of conductor coils with an insulating material, wrapping the connection ring with the insulating material, positioning the connection ring underneath a winding overhang portion, and securing, via woven glass cloth or tape, the connection ring to the winding overhang portion.

In yet another aspect, the invention provides a method for refurbishing an existing wound rotor for use in an electric machine. The method includes at least partially disassembling the existing wound rotor to provide access to a winding overhang portion of the existing wound rotor, individually wrapping each one of a plurality of conductor coils with an insulating material, wrapping a connection ring with the insulating material, repositioning the connection ring from a location outside of the winding overhang portion to a location underneath the winding overhang portion, and securing, via woven glass cloth or tape, the connection ring to the winding overhang portion.

Other aspects of the invention will become apparent by consideration of the detailed description and accompanying drawings.

Other aspects of the embodiments described herein will become apparent by consideration of the detailed description.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

FIGS. 1-7 illustrate various perspective views of an existing wound rotor 100 that experienced failure during usage in a wind turbine generator. The existing wound rotor 100 of the illustrated example was implemented in a wind turbine generator that has respective power and voltage ratings of 660 kilowatts (kW) and 700 volts (V). However, it should be understood that description herein of the flaws and proposed improvements to the design of the existing wound rotor 100 may also be applicable to wound rotor designs implemented in wind turbine generators or other electric machines having other electrical ratings. For example, the electric machine may include an induction motor/generator and/or a synchronous motor/generator. Further, the designs and methods for constructing, installing, and/or refurbishing wound rotors described herein may also be applicable to wound rotor generators/motors rated to 600-800 kW, 525-700V, 50-60 Hertz (Hz), and a synchronous speed of 1000-2000 rotations per minute (rpm). In some instances, the designs and methods for constructing, installing, and/or refurbishing wound rotors described herein are applicable to wound rotor generators/motors with different electrical ratings not explicitly described herein.

As will be described in more detail below, failure of one or more of the components included in the existing wound rotor 100 may be attributed to deficiencies in the designs, methods, and/or materials used to construct, install, and/or refurbish the existing wound rotor 100. As one example, the existing wound rotor 100 lacks sufficient bracing and structural support for cabling, the phase, or line, and star coil connections, winding overhang, and other components included in the wound rotor 100. The wound rotor 100 has what may be referred to as a "flexible design," as the coil connections and winding overhang are free to move during operation of the wind turbine generator. Wind turbine generators experience high thermal and mechanical cycling due to changing wind conditions, loads, vibrations, and ambient temperatures thereby causing movement of the coil connections and a winding overhang that are not properly secured. Over time, movement of the coil connections and winding overhang leads to insulation damage and fatigue failure of various rotor components.

Figure 1:
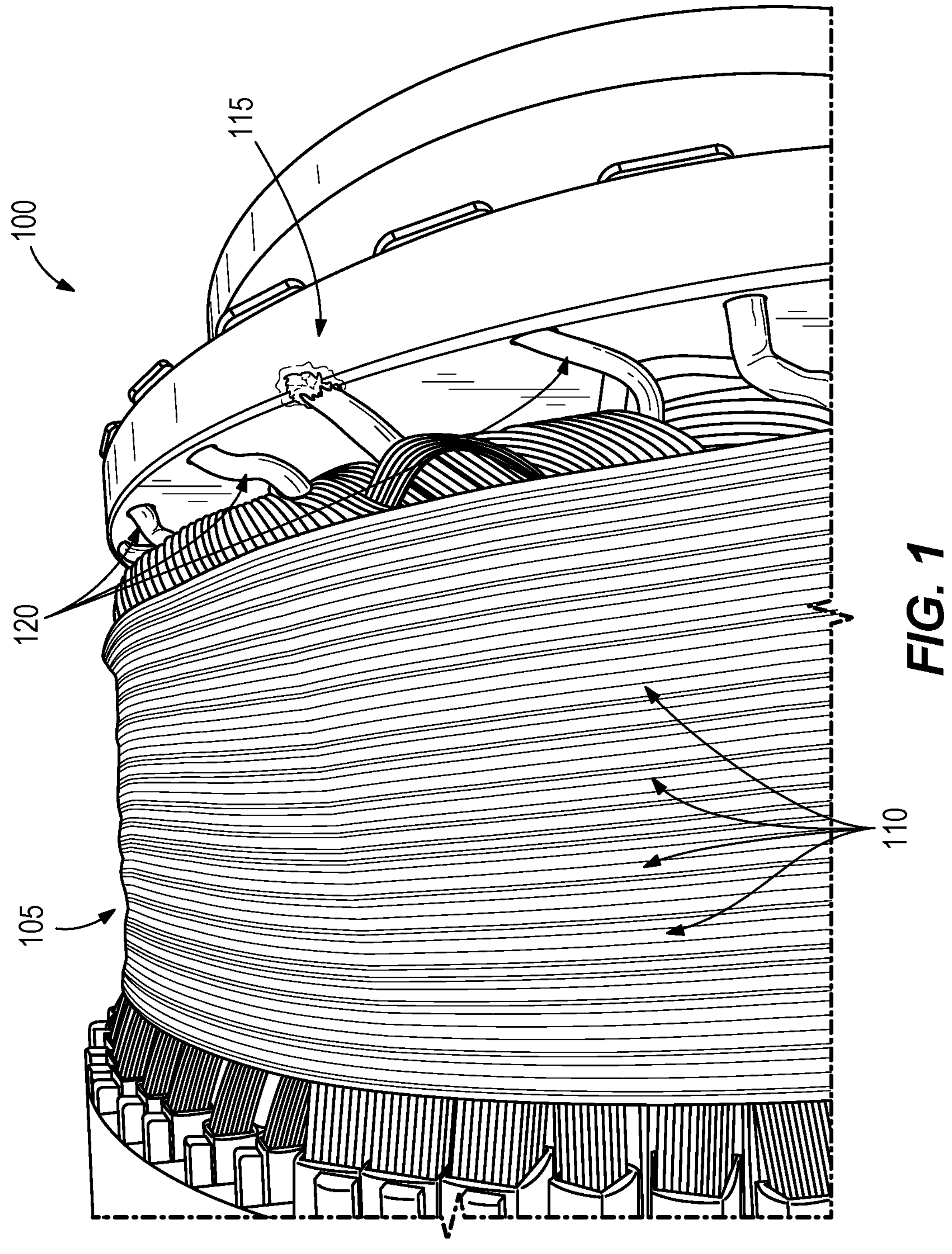
FIG. 1 illustrates an existing wound rotor that experienced failure during usage in a wind turbine generator.
Figure 2:
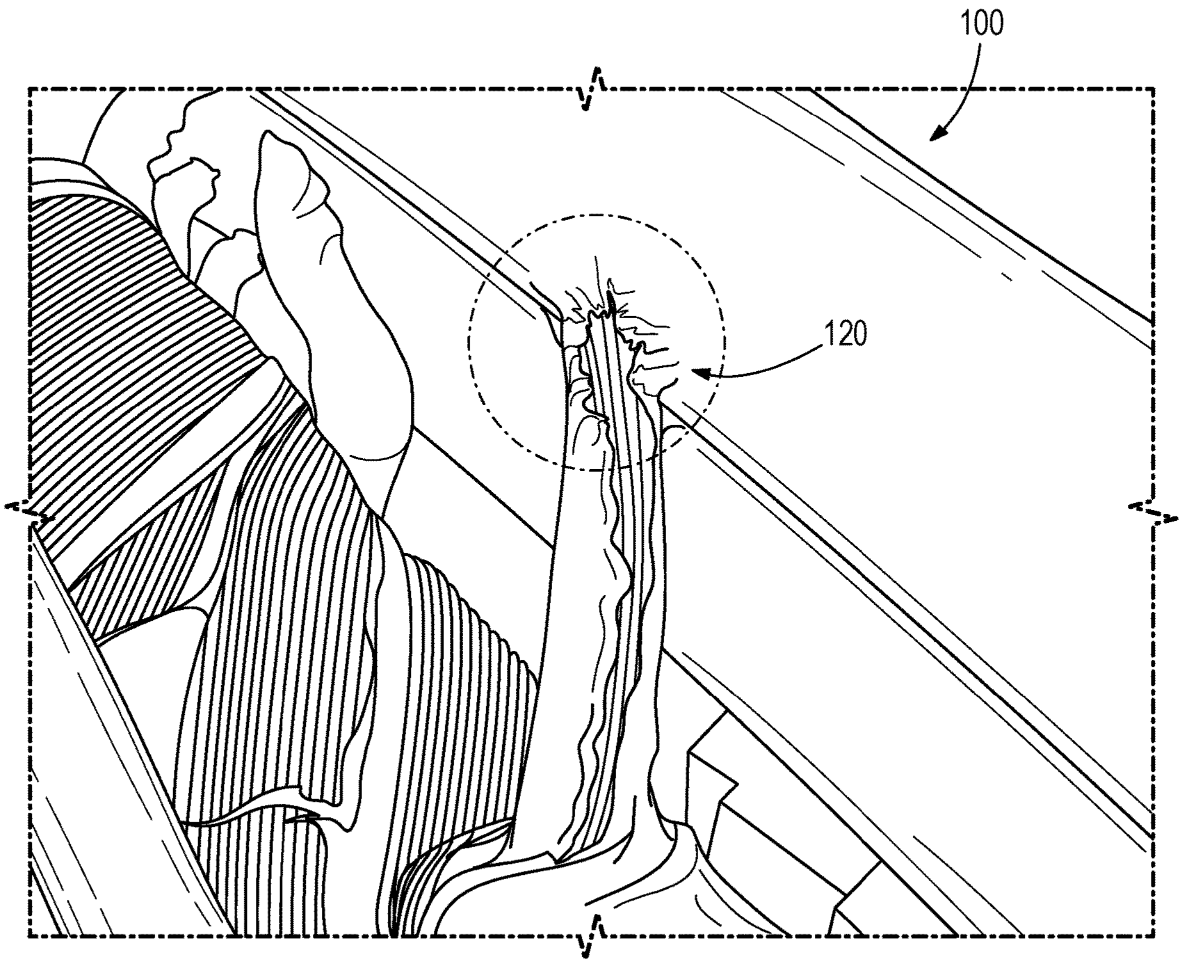
FIG. 2 further illustrates the existing wound rotor of FIG. 1, including a phase connection element.

Referring now to FIG. 1, the wound rotor 100 includes a winding overhang portion, or winding overhang, 105. As shown, the winding overhang 105 is banded together along the outer diameter of the winding overhang 105 using only a resin-glass banding 110. This resin-glass banding 110 pulls down on the winding overhang 105 and is used to secure the winding overhang 105 in place during operation of the wind turbine generator. The winding overhang 105 is connected to a connection ring 115 by a plurality of phase connection elements 120, which are not supported or reinforced by any support structures. Rather, as shown, the phase connection elements 120 simply extend between the winding overhang 105 and the connection ring 115. Accordingly, as shown in FIG. 2, the phase connection elements 120 have failed after prolonged operation of the wound rotor 100.

Figure 3:
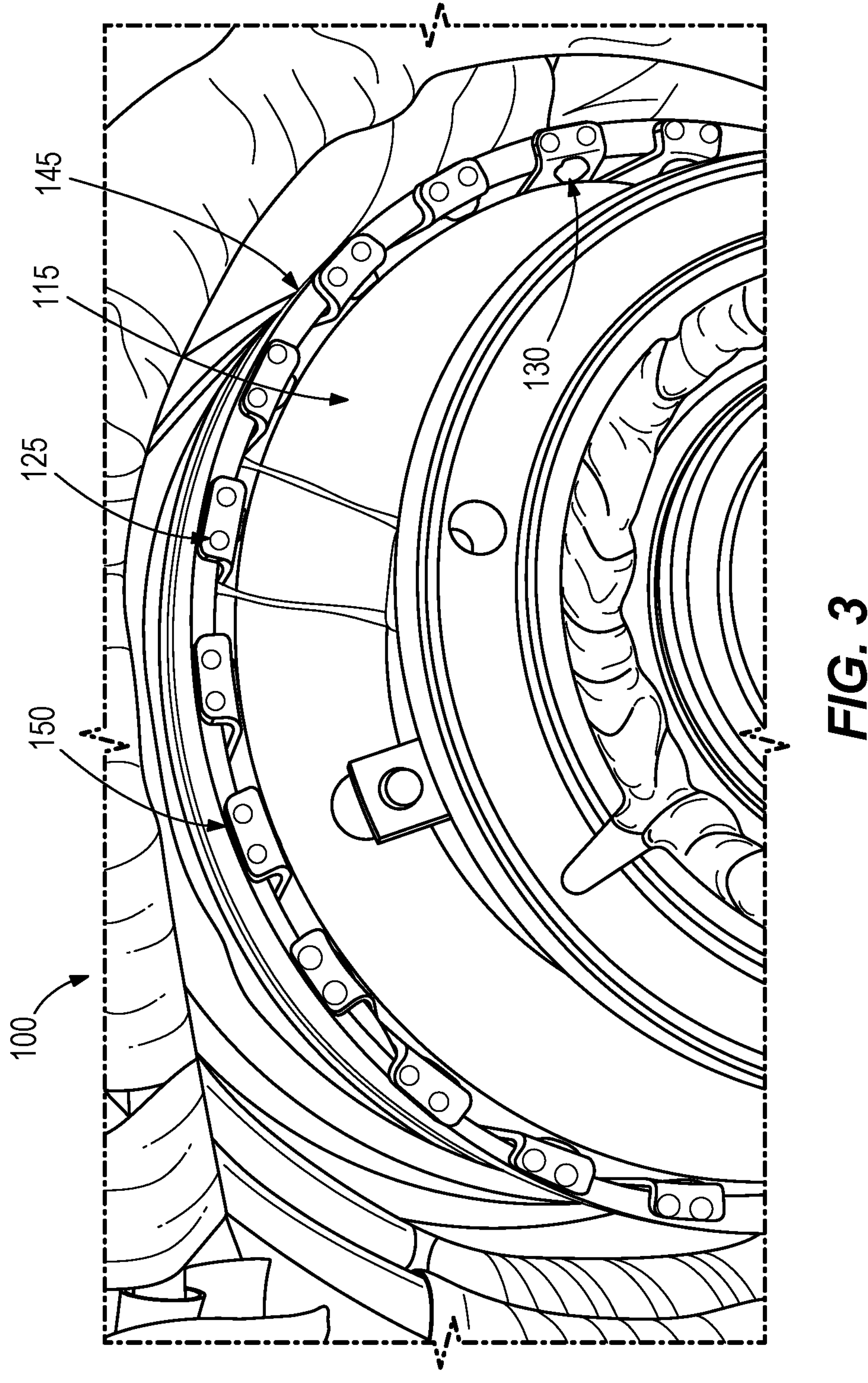
FIG. 3 further illustrates the existing wound rotor of FIG. 1, including a connection ring.
Figure 4:
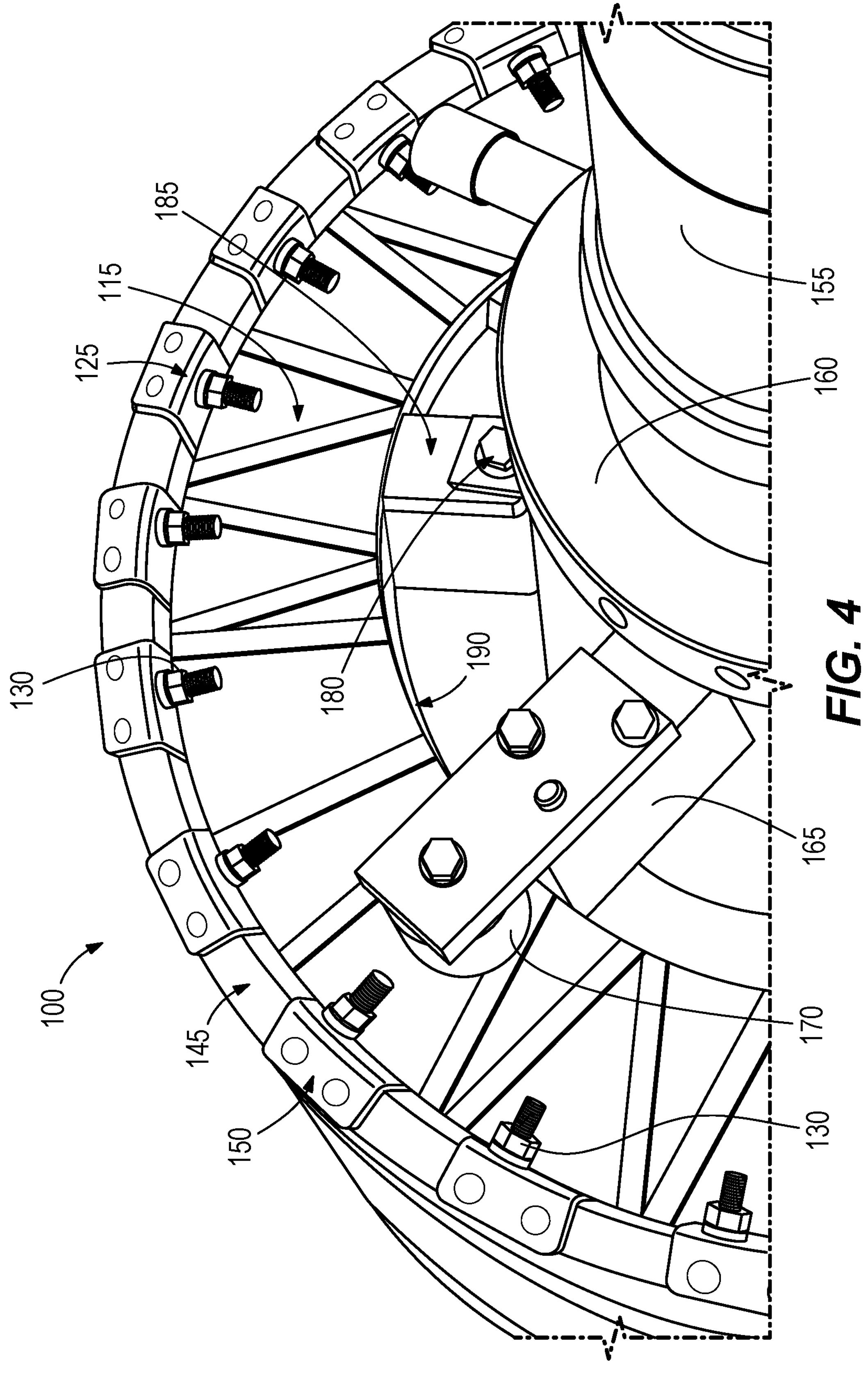
FIG. 4 further illustrates the existing wound rotor of FIG. 1, including the connection ring.
Figure 5:
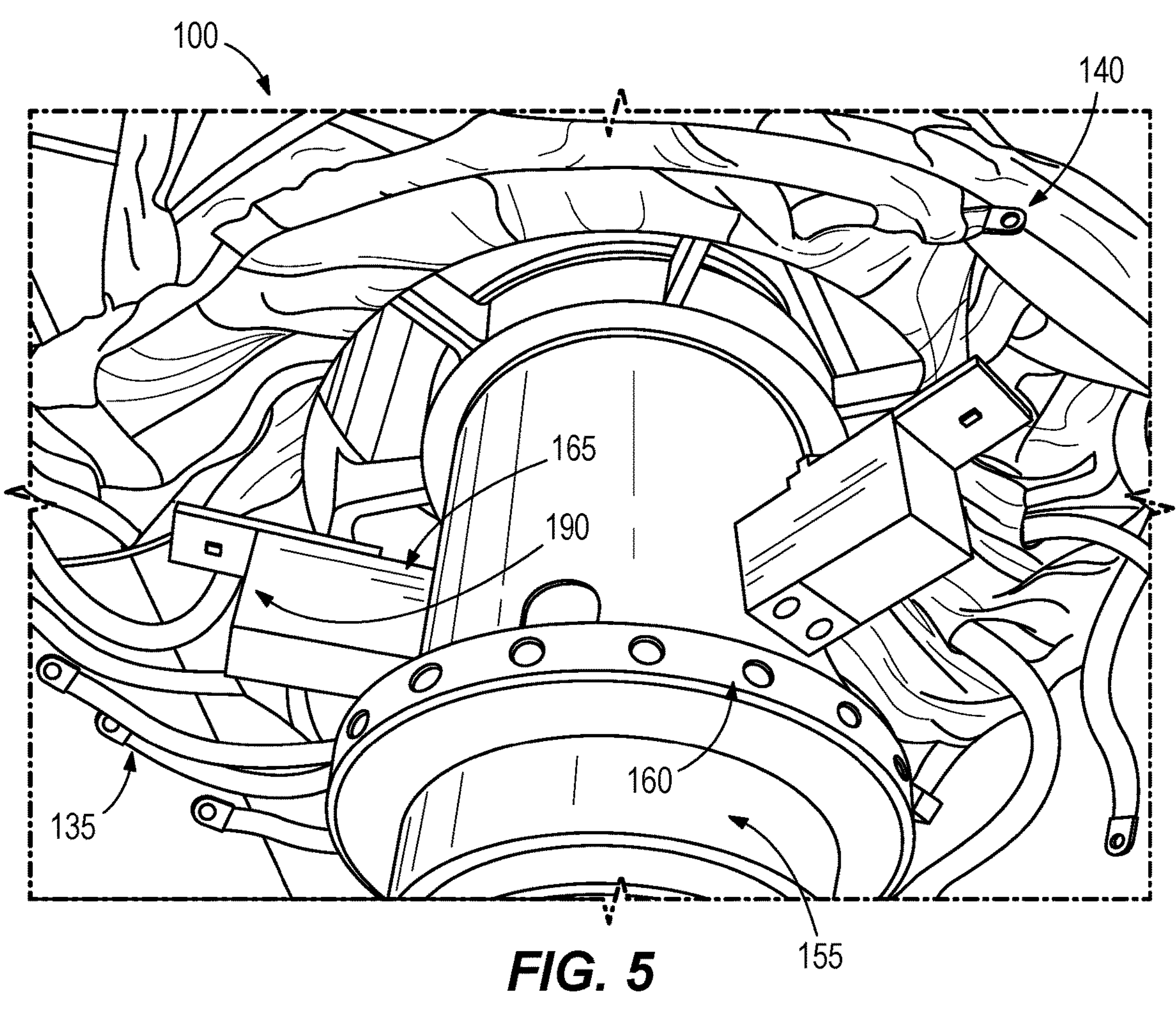
FIG. 5 further illustrates the existing wound rotor of FIG. 1, including coil ends of motor windings.
Figure 6:
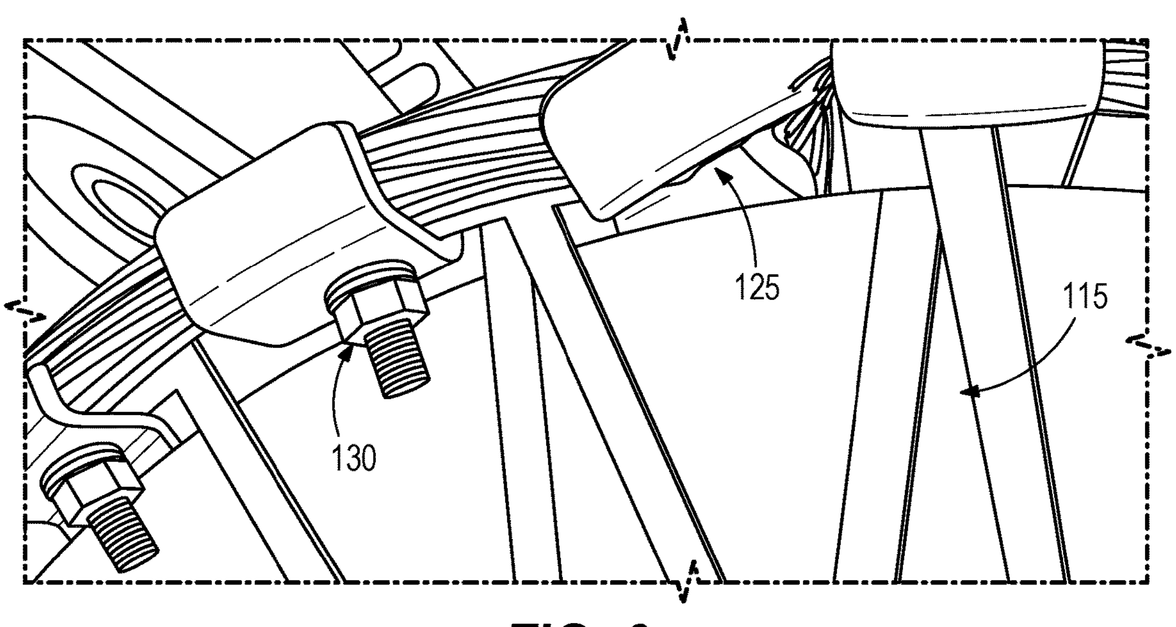
FIG. 6 further illustrates the existing wound rotor of FIG. 1, including a failed bent tab.

With reference to FIGS. 3-5, the connection ring 115 is formed of conductive plates, which are insulated from each other to make parallel phase connections and the star connections. The conductive plates are supported by bolted and brazed bent connection tabs, or bent tabs, 125. As shown, the bent tabs 125 are bolted, via bolts 130, to the coil ends 135 (FIG. 5) of the rotor windings. In particular, the bent tabs 125 are bolted to crimped lugs 140 (FIG. 5) that extend from and connected to respective coil ends 135. These bent tabs 125 are only braced and secured on the outer diameter 145 of the connection ring 115, as the axial sides 150 of the bent tabs 125 are not secured or physically supported. Thus, movement and vibration of the bent tabs 125 and connection ring 115 occurs during operation of the wind turbine generator. Furthermore, inconsistent and dissimilar materials were used to construct the bent tabs 125, bolts 130, and various other connection washers, spring washers, and nuts used for securing the connection ring 115, coil ends 135, crimped lugs 140, and other components. As a result, unequal thermal expansions and galvanic reactions of the dissimilar materials have caused additional stresses in and damage to these connection components over continued operation of the wound rotor 100. FIG. 6 illustrates a failed bent tab 125.

With further reference to FIGS. 3-5, the connection ring 115 is secured to the rotor shaft 155 by a balancing ring 160, three insulating blocks 165, and 2-inch wide insulators 170. The connection ring 115 is axially displaced along the length of the rotor shaft 155 from the balancing ring 160, and thus, the physical connection between the connection ring 115 and the rotor shaft 155 is not directly perpendicular to the connection ring 115 or the rotor shaft 160. Therefore, undesirable and damaging torsional forces, movement, and vibrations are induced on the connection ring 115 during operation of the wound rotor 100.

Figure 7:
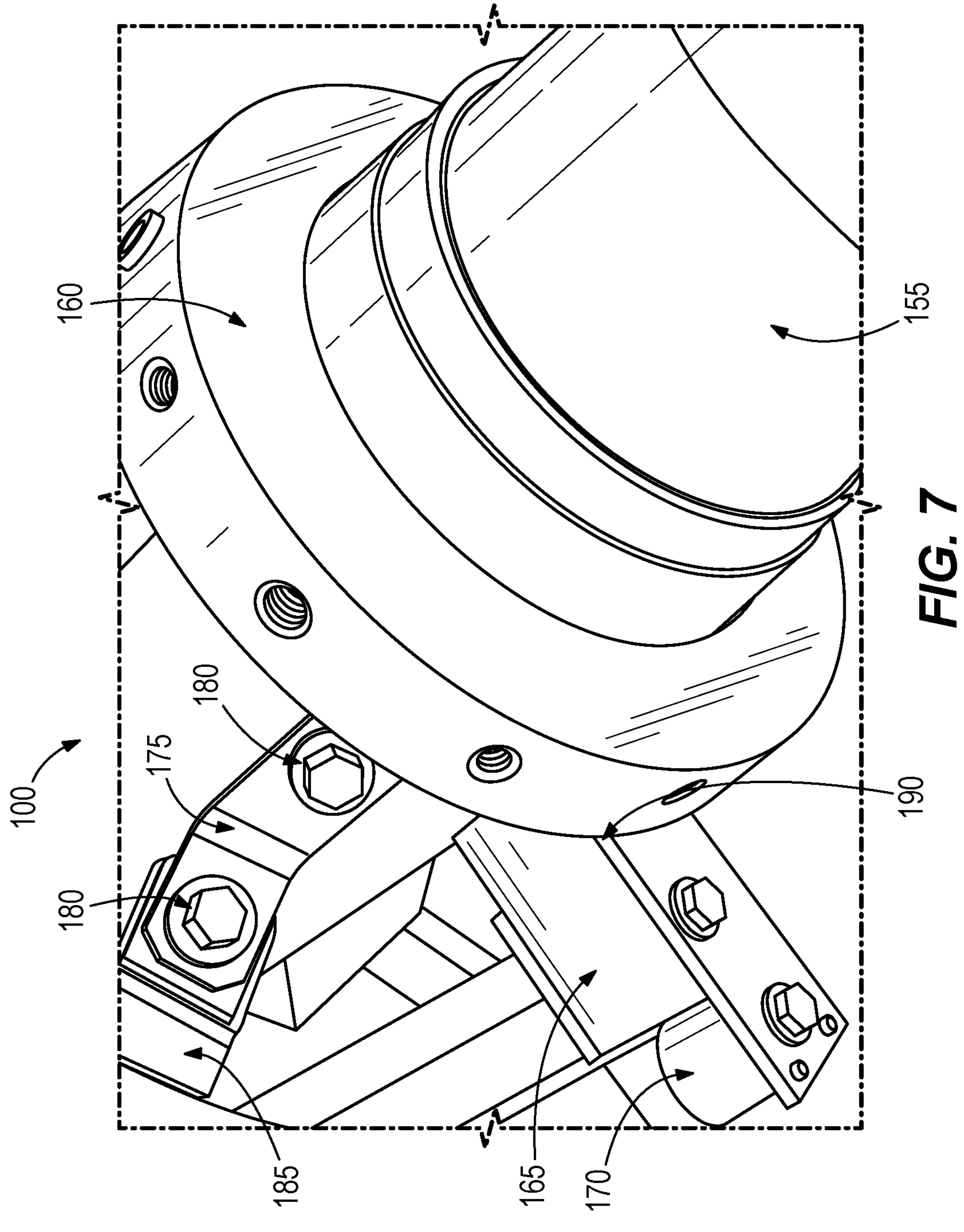
FIG. 7 further illustrates the existing wound rotor of FIG. 1, including conductors and connection tabs.

With reference to FIGS. 4, 5, and 7, the line connections are made by coupling L-shaped conductors 175, via bolts 180, between respective connection tabs 185 disposed on the inner diameter 190 of the connection ring 115 and connection holes formed in the rotor shaft 155. Similar to the materials used to construct the bent tabs 125 and bolts 130, the L-shaped conductors 175, bolts 180, and connection tabs 185 are constructed from inconsistent and dissimilar materials. Therefore, unequal thermal expansions and galvanic reactions of the dissimilar materials used to construct the L-shaped conductors 175, bolts 180, connection tabs 185, and other fasteners used to make the line connections result in additional stresses and damage to these connection components over continued operation of the wound rotor 100. Furthermore, apart from the insulating material disposed between the conductive plates that form the connection ring 115, the line connections between the rotor shaft 155 and the connection ring 115 are not radially secured. Accordingly, the L-shaped conductors 175, bolts 180, and connection tabs 185 often fail in a similar manner to that of the failed bent tab 125 illustrated in FIG. 6.

FIGS. 8-15 illustrate a wound rotor 800 that is designed for use in a wind turbine generator, according to one example of the present disclosure. As will be described in more detail below, the design of the wound rotor 800 improves upon, among other things, deficiencies associated with design of the existing wound rotor 100 described herein. In some instances, the design of the wound rotor 800 described herein is used for constructing and/or installing a new wound rotor for use in a wind turbine generator. In other instances, the design of the wound rotor 800 described herein is used to refurbish and/or reconstruct an existing wound rotor, such as the existing wound rotor 100, that has already been operated in a wind turbine generator. For example, a technician may refurbish and/or reconstruct the existing wound rotor 100 in accordance with the design for the wound rotor 800.

Figure 8:
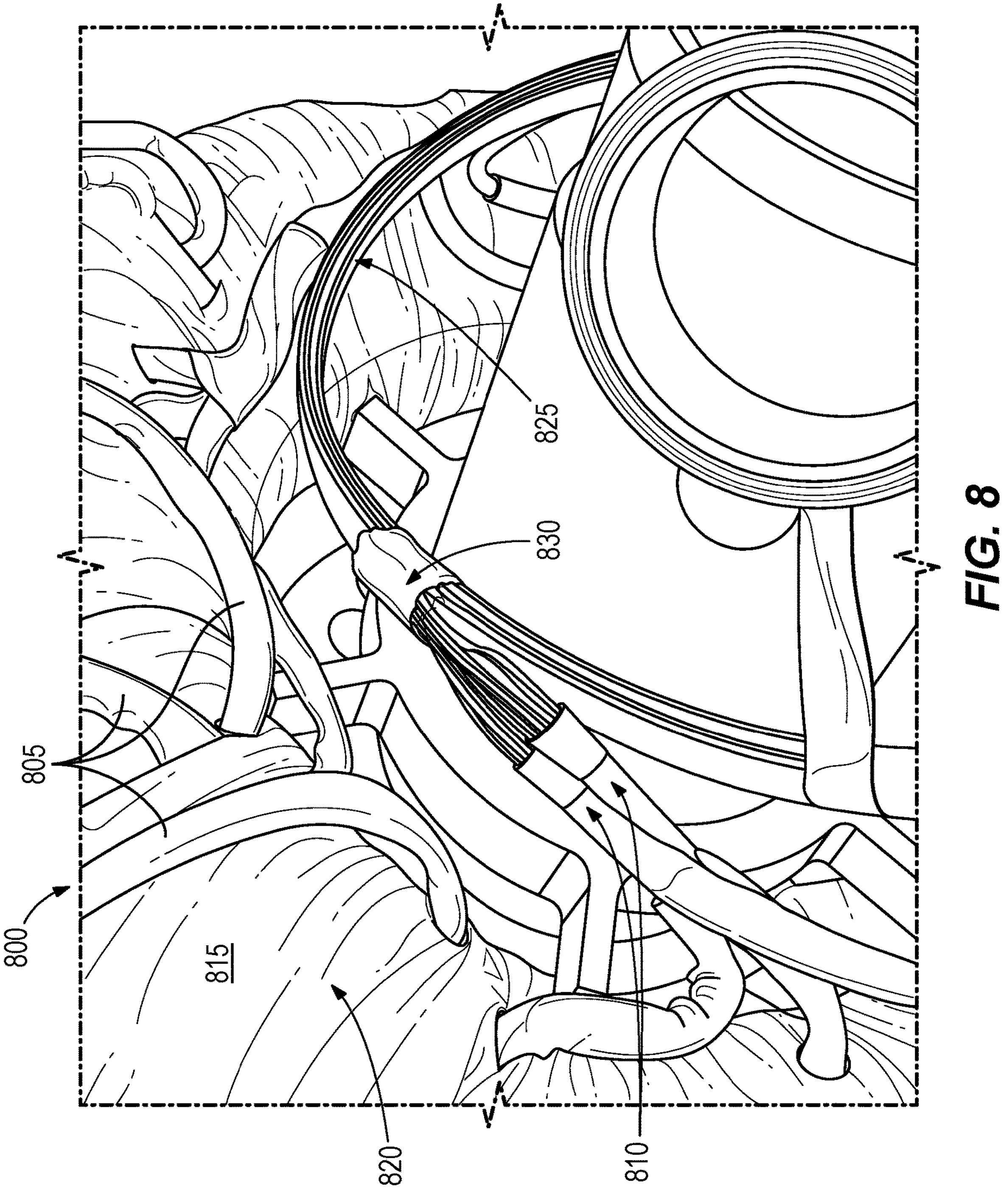
FIG. 8 illustrates an improved wound rotor that is designed for use in a wind turbine generator.

When compared to the existing wound rotor 100 described above, the design of the wound rotor 800 includes more robust bracing and structural support for coil connections, winding overhang, cabling, and various other rotor components. With reference to FIG. 8, the wound rotor 800 includes an improved winding overhang and connection design in which only the conductor coils used to make the phase, or line, connections 805 and star connections 810 are brought out, or extended, from the winding overhang 815. All other coil connections are made internally at the coil ends 820. The star connections 810 are made by directly connecting the ends of the star coils to a connection ring 825. For example, a brazed, tig welded, and/or soldered connection 830 is formed between the star connections 810 and the connection ring 825. The connection ring 825 consists of a high conductivity material, such as copper, and is constructed by combining several rectangular/square conductor sections in parallel. When compared to the connection ring 115 described above, the connection ring 825 is easier to maneuver while making the star connections 810 and securing the connection ring 825 to winding overhang 815. Moreover, by constructing the connection ring 825 in this manner, torsional stresses on the connection ring 825 and the amount of labor needed to construct the winding overhang 815 and connection ring 825 are reduced.

Figure 9:
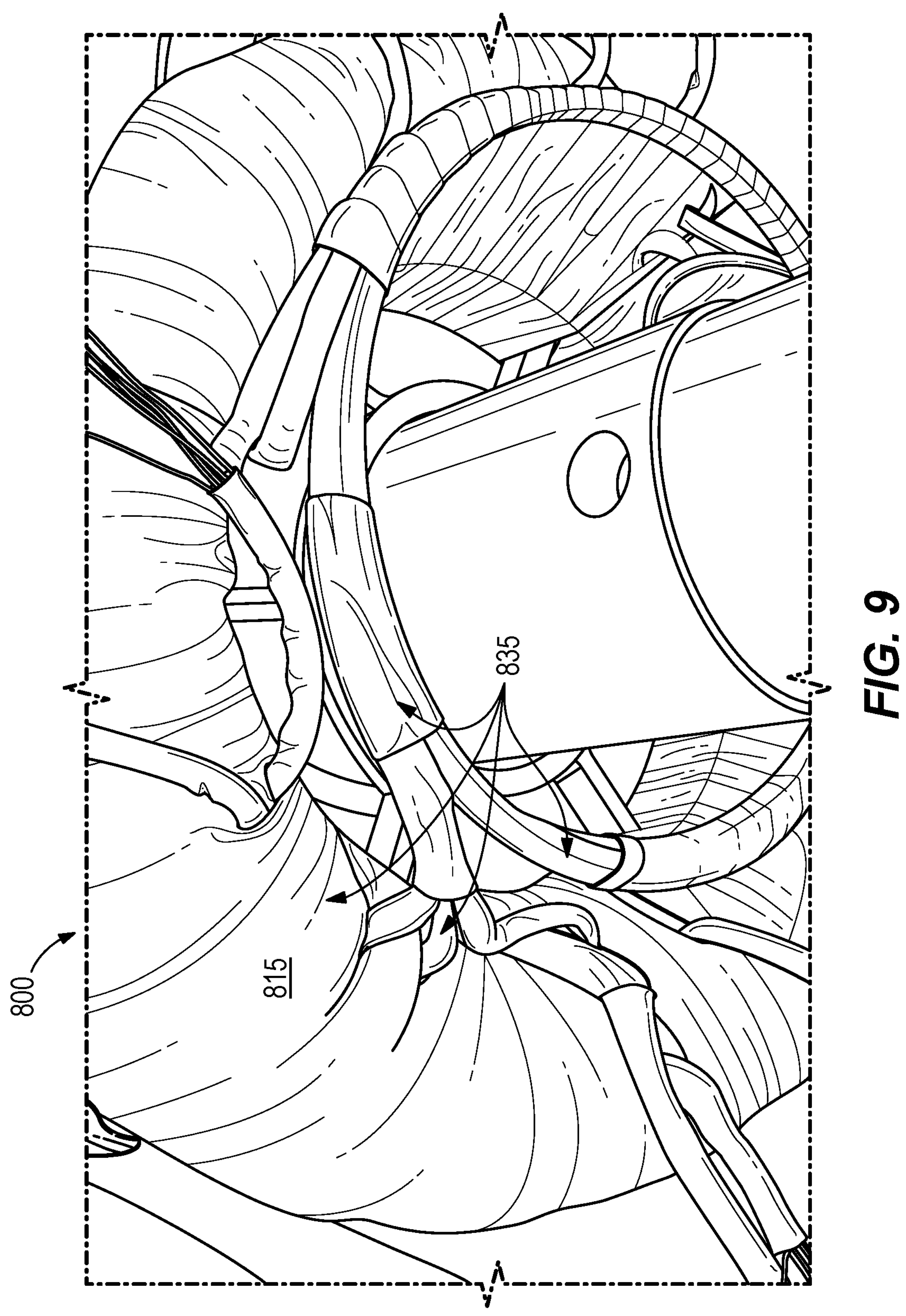
FIG. 9 further illustrates the improved wound rotor of FIG. 8, including winding overhang and insulation covering exposed portions of star connections, coil ends, and the connection ring.
Figure 10:
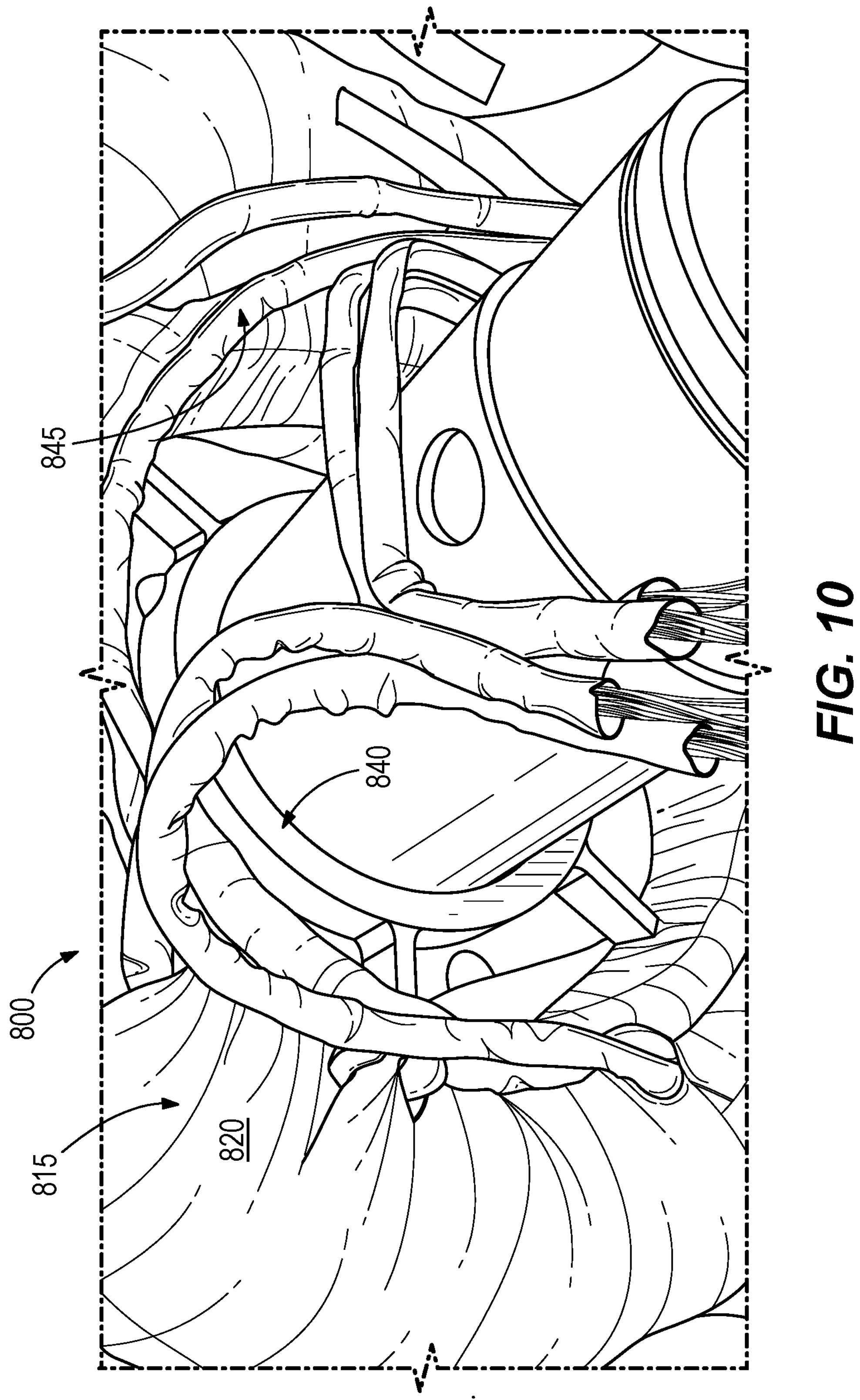
FIG. 10 further illustrates the improved wound rotor of FIG. 8, including an overhang support ring 840.
Figure 11:
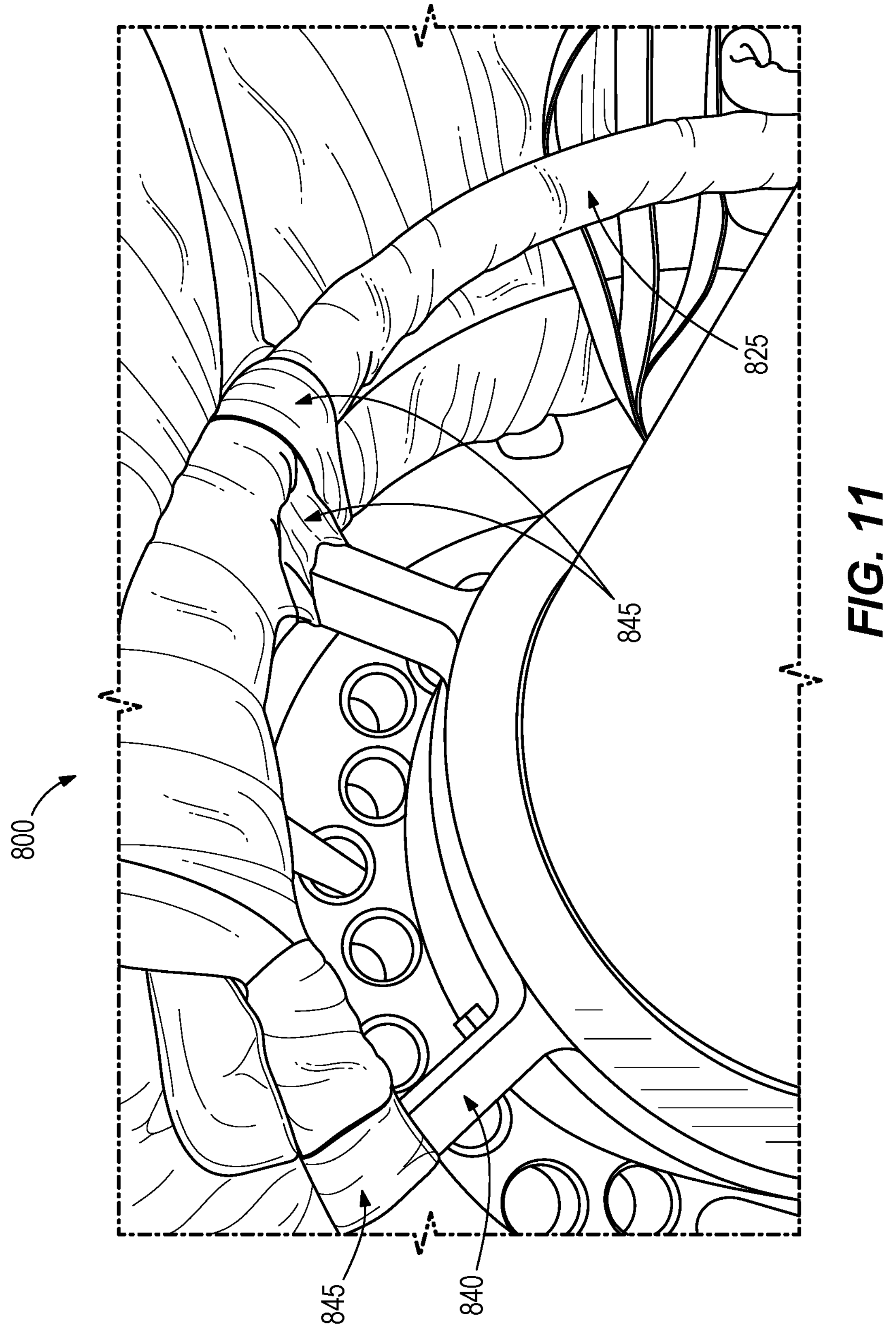
FIG. 11 further illustrates the improved wound rotor of FIG. 8 including the overhang support ring 840.

After forming the star connections 810 with the connection ring 825, the exposed portions of the star connections 810, the coil ends 820, and the connection ring 825 are covered with and/or wrapped in insulation 835 (FIG. 9). With reference to FIGS. 8, 10 and 11, the connection ring 825, and correspondingly the star connections 810, are moved below the winding overhang 815 after being insulated. While underneath the winding overhang 815, the star connections 810 and the connection ring 825 are secured to the winding overhang 815 and a steel overhang support ring 840 using woven glass tape/cloth 845.

Figure 12:
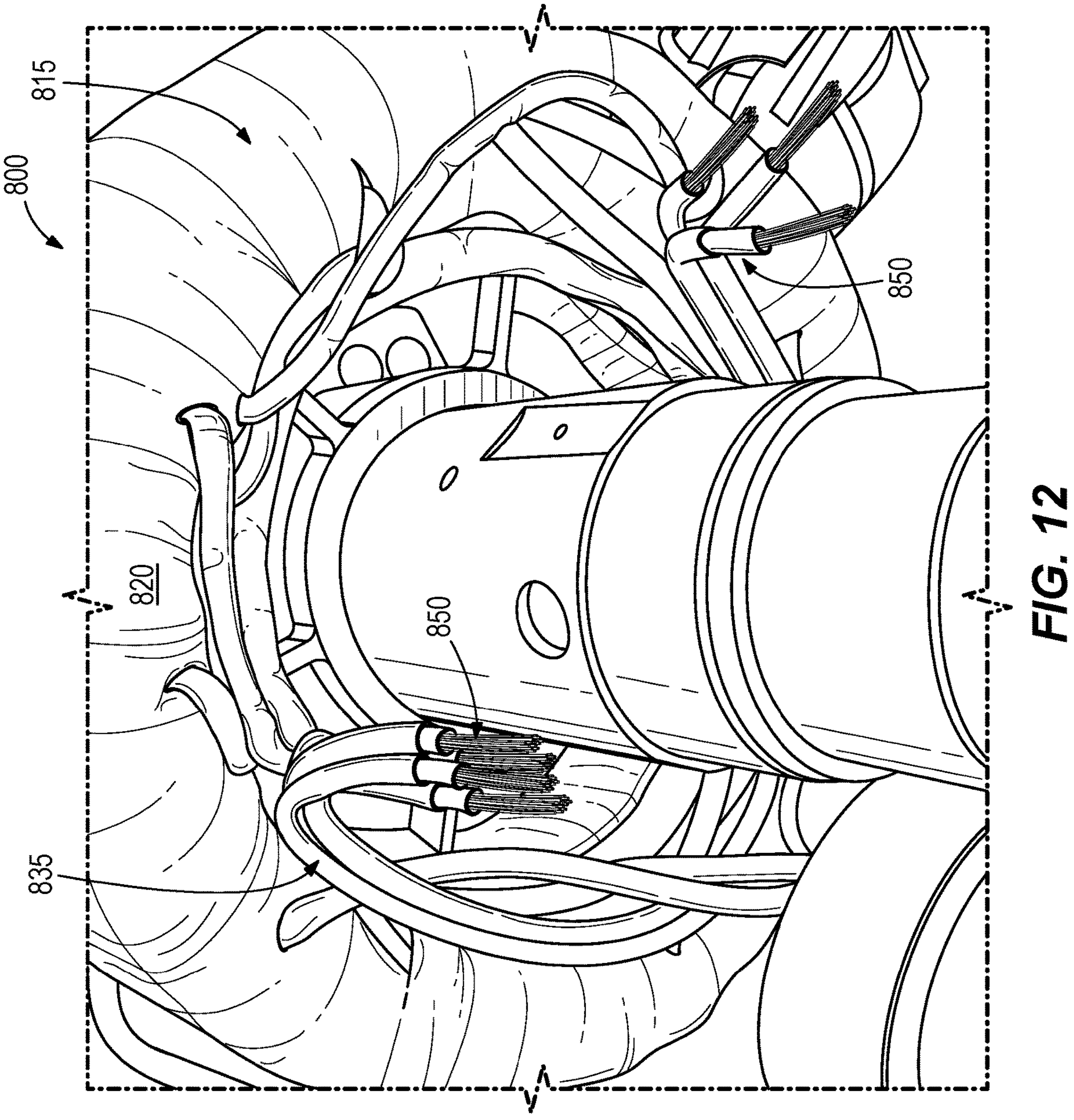
FIG. 12 further illustrates the improved wound rotor of FIG. 8, including parallel circuit coils.
Figure 13:
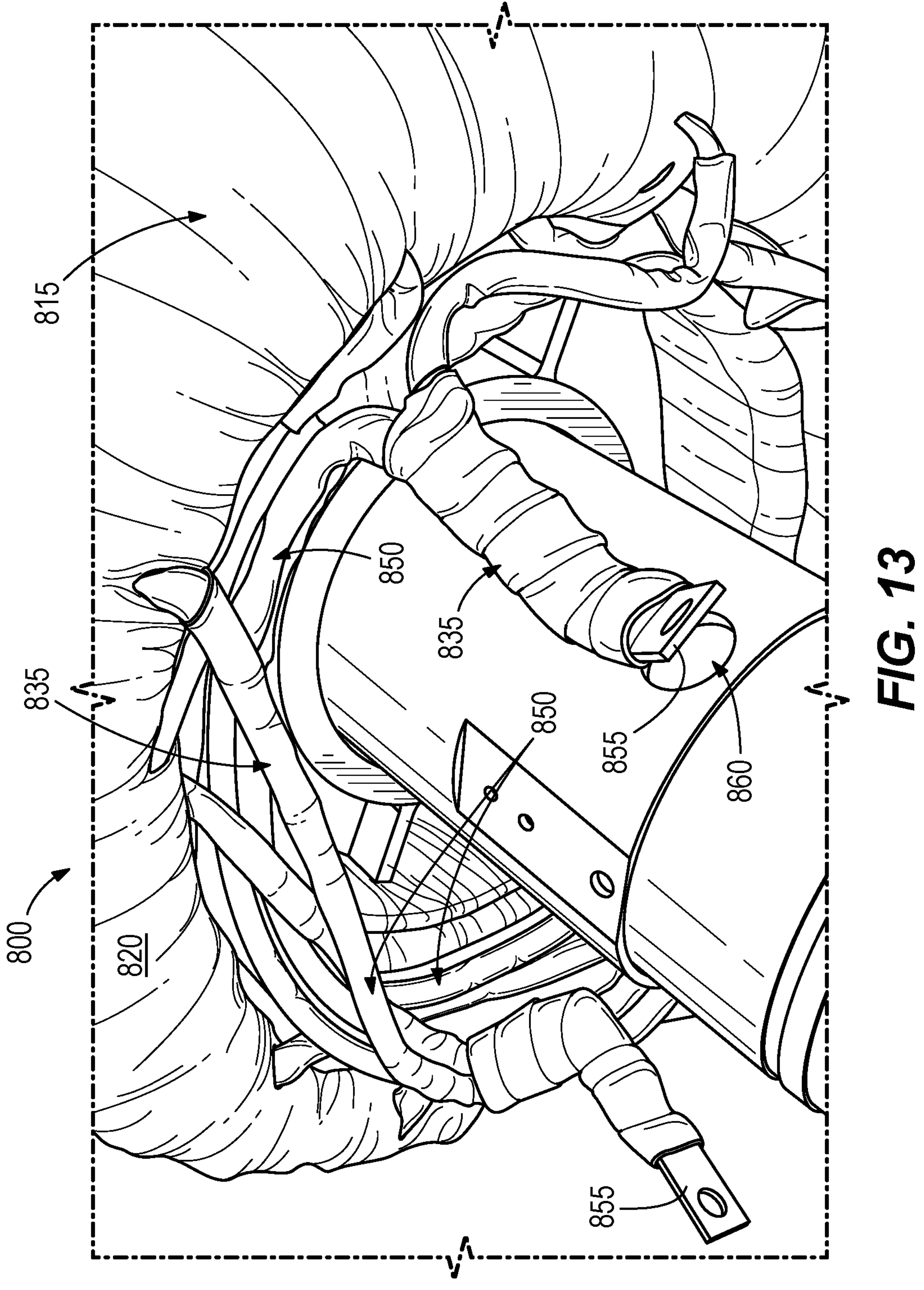
FIG. 13 further illustrates the improved wound rotor of FIG. 8, including high conductivity lugs for line connections.
Figure 14:
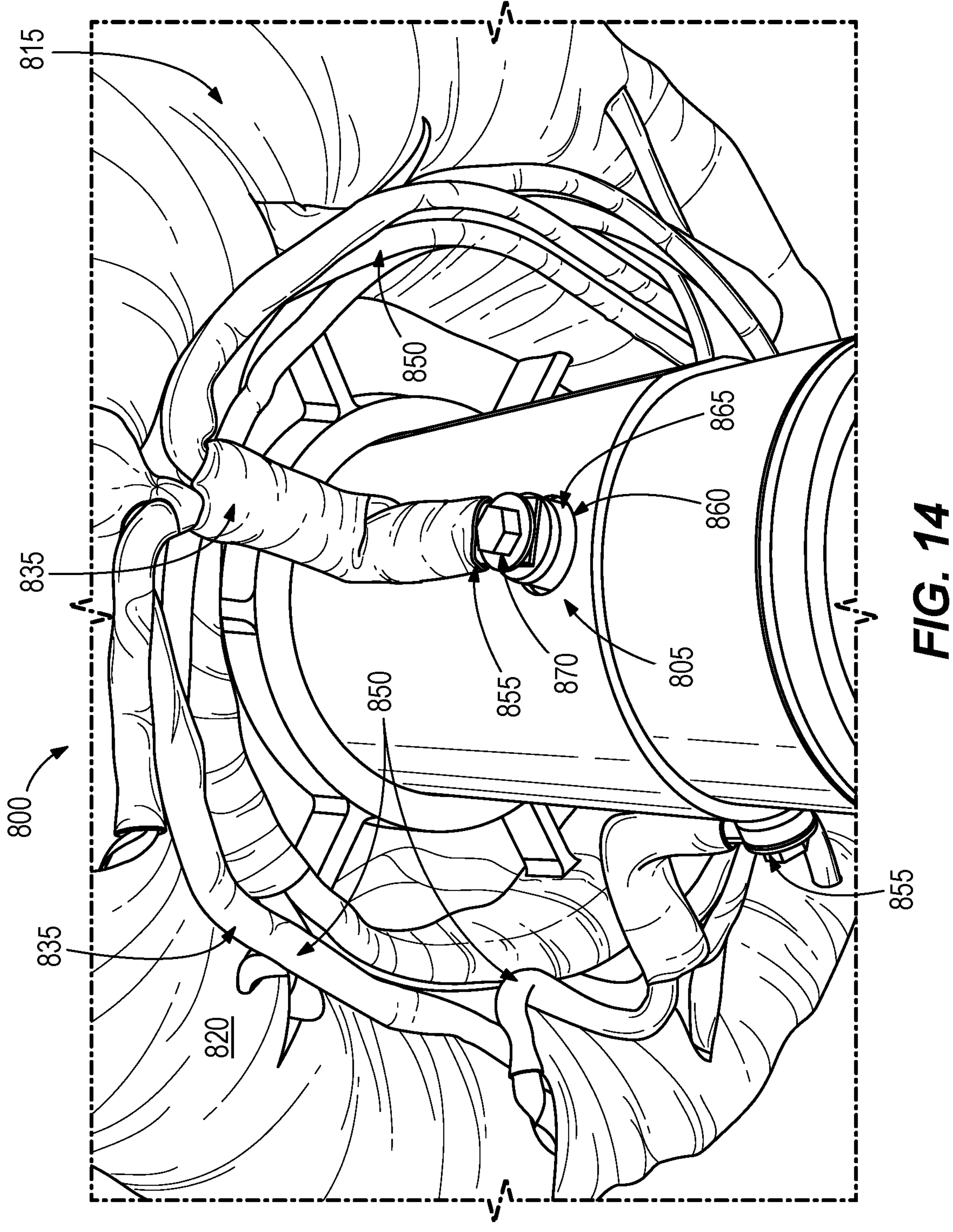
FIG. 14 further illustrates the improved wound rotor of FIG. 8, including the high conductivity lugs for the line connections.
Figure 15:
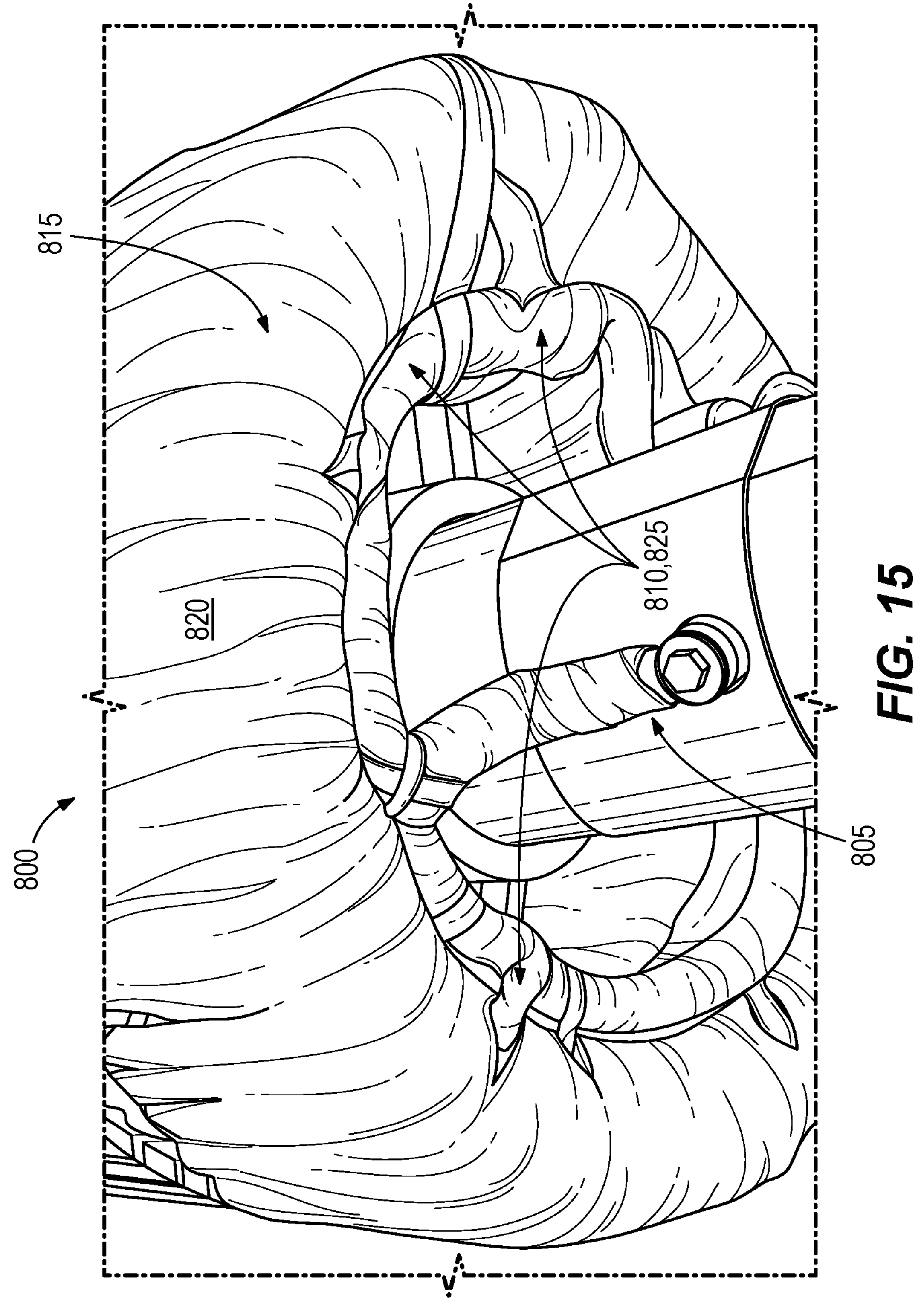
FIG. 15 further illustrates the improved wound rotor of FIG. 8, including the connection ring.

Referring now to FIGS. 12-14, formation of the line connections in the wound rotor 800 will be described. When forming the line connections 805, the ends of parallel circuit coils 850 used to make the line connections 805 are directly crimped into respective high conductivity lugs 855 (FIG. 13). Additionally, the coils are covered with insulation 835. As shown in FIGS. 13 and 14, the line connections 805 are formed by coupling the lugs 855 directly to down-shaft leads 865 through openings 860 in the rotor shaft via a bolted connection (e.g., a threaded fastener such as a bolt 870), thereby eliminating the need for a connection disk (e.g., the connection disk 160 described above with respect to the existing wound rotor 100). After the line connections 805 are formed, the coils 850 used to make the line connections are bent/shaped and bound together underneath the winding overhang 815 (FIG. 14). Accordingly, when compared to the existing wound rotor 100, the line connections 805 in the wound rotor 800 are formed without a need for complicated interconnections between a balancing ring 160, insulating blocks 165, bolted L-shaped conductors 175, or the connection tabs 185 described above. Thus, by comparison, the winding and installation of wound rotor 800 is much easier on a technician than the winding and installation of the existing wound rotor 100.

In addition to insufficient bracing and structural support for components such as cabling, coil connections, and the winding overhang, the existing rotor 100 also lacks sufficient insulation for the above-described connection elements. As described above, a wind turbine generator experiences high thermal and mechanical cycling due to changing wind conditions and load demands. Thus, without proper insulation, the rigid materials and components used to form the various connections included in the existing wound rotor 100 experience failure after prolonged subjection to torsional forces, vibrations, and temperature changes during operation of the wind turbine generator.

Accordingly, the design of the wound rotor 800 further improves upon the insulation deficiencies of the existing wound rotor 100. With reference to FIGS. 9-15 and as described above, the connection components included in the wound rotor 800 are insulated separately before being bound together with or secured to other connections and/or components of the wound rotor 800 using woven glass tape/cloth. For example, star connections 810 and the connection ring 825 are individually insulated before moving the star connections 810 and the connection ring 825 underneath the winding overhang 815. As opposed to the rigid components bound together in the existing wound rotor 100, the individually insulated connection components remain flexible and easy to maneuver during construction and installation of the wound rotor 800. Thus, construction and installation of the wound rotor 800 is made easy thereby reducing technician fatigue, the number of hours needed to complete installation of the wound rotor 800, and the amount of stresses on the connections, windings, and insulation during installation.

In some instances, the line connections 805, the star connections 810, the winding overhang 815, the coil ends 820, and/or the connection ring 825 are insulated using one or more of polyimide film, polyester film, glass cloth, woven glass tape, and polyimide mica paper. In some instances, the insulation of the line connections 805, the star connections 810, the winding overhang 815, the coil ends 820, and/or the connection ring 825 may be further reinforced with a combination of one or more of glass cloth, polyester film, polyester mat, and/or braided fiberglass sleeving. In the illustrated example, the components of wound rotor 800 are individually insulated with a ½ lap layer of polyimide film, two ½ lap layers of mica paper reinforced with glass tape, and a ½ lap layer of woven glass tape with 2× braided fiberglass sleeving. After the connection components are individually insulated and bound to each other and/or other components of the wound rotor 800, the insulation is vacuum pressure impregnated using a high strength epoxy, polyester, and/or silicone resin which may be of the thixotropic type to increase insulation build. After the resin cures, the resultant high-strength and rigid winding overhang and connection design of wound rotor 800 is capable of withstanding the high temperature and load cycling experienced by a wind turbine generator.

In addition to the above-described structural and insulation issues, many existing wound rotors, such as the existing wound rotor 100, are constructed using conductors of varying sizes and different winding configurations. Thus, there is a lack of uniformity among wound rotors implemented in wind turbine generators. When inconsistent conductor sizes and/or types are used to construct the winding coils, standardization of the overhang support structures, and banding used to refurbish existing wound rotors is not possible. Moreover, the job of a service technician is complicated when each wind turbine generator being serviced is constructed using varying conductor sizes and winding patterns. For example, winding coils that are formed by a high number of conductors connected in parallel, often of varying sizes, result in frequent service technician errors as the conductors are difficult to maneuver and re-wind during repair. Furthermore, performance of the wind turbine generator suffers when winding coils are constructed from conductors of varying sizes, as the rotor slot fill and current density differs among conductors of varying sizes. For example, the current density of a rotor winding may be less than the necessary rating for a wind turbine generator application when conductors of varying and/or inconsistent sizes are used to construct the winding coils.

As an example, the winding coils of the existing wound rotor 100, which were constructed from conductors of varying sizes, total 13.5 $mm^2$ in conductor area per turn resulting in a current density of 3.03 amperes (A)/$mm^2$. This current density value is relatively low for a 660 kW wind turbine generator application. Thus, to improve the current density value of the rotor windings, the winding pattern of the wound rotor 800 has been standardized such that the current density and/or total conductor area per turn of the rotor winding coils lie within target ranges that are suitable for a wind turbine generator application. In one example, the rotor windings of the wound rotor 800 are constructed from twelve parallel-connected conductors of American Wire Gauge (AWG) #17 size per turn. This configuration of parallel-connected AWG17 conductors results in a total conductor area per turn of 12.5 $mm^2$, thereby increasing the current density of the rotor winding to 3.29 $A/mm^2$.

To avoid rotor windings that have too low of a current density, the total conductor area per turn of the conductors used to construct the winding coils of the wound rotor 800 should not exceed 12.5-13 $mm^2$. In some instances, the total conductor area per turn of the conductors used to construct the winding coils of the wound rotor 800 should lie within a range of 10-13 $mm^2$. Persons skilled in the art will appreciate that the size and arrangement of conductors that achieve this target total conductor area per turn is not limited to the twelve parallel-connected AWG17 conductors described above, as other combinations of conductors can be used to construct winding coils having a total conductor area per turn that lies within the range of 10-13 $mm^2$. For example, in some instances, the winding coils included in the wound rotor 800 may be constructed from six parallel-connected AWG14 conductors, ten parallel-connected AWG16 conductors, 15 parallel-connected AWG18 conductors, or a combination of two parallel-connected AWG14 ant ten parallel-connected AWG18 conductors. In some instances, other conductor combinations not explicitly described herein that result in rotors winding coils having a total conductor area per turn that lies within the range of 10-13 $mm^2$ are used to construct the rotor windings. In still other instances, the number of parallel paths may be halved, thereby only having a total conductor area per turn within the range of 5-8.5 $mm^2$, or half of the 10-13 $mm^2$ range.

By standardizing the total conductor area per turn of the conductors used to construct the windings of the wound rotor 800, the physical size of the winding overhang 815 will be consistent for any wound rotor that is constructed using the design of wound rotor 800. Thus, the tooling, bandings, and structural support requirements for constructing, installing, and/or refurbishing the wound rotor 800 can be standardized. Moreover, standardization of a winding's total conductor area per turn when constructing, installing, and/or repairing wound rotors results in predictable testing and performance, consistent rotor slot fill, and reduced labor time. In addition, standardizing the conductor sizes used to construct the rotor windings also decreases the likelihood of running into supply chain issues when servicing a wound rotor in the field.

As yet another added benefit of standardizing the total conductor area per turn of the winding coils when constructing, installing, and/or repairing wound rotors, the type and amount of insulation used to insulate the conductors can also be standardized. Therefore, instances in which conductors are not properly insulated (e.g., conductor insulation does not meet rating requirements of a wind turbine generator application) are mitigated as service technicians can be certain of the type and/or amount of insulation needed to satisfy the rating requirements of the winding conductors.

In some instances, conductor insulation is selected based on the volt per turn ratings of the conductors that form the coils of a rotor winding. However, depending upon which winding pattern is used to construct the rotor winding, insulation used to coat a conductor may be insufficient. As an example, when a conductor included in the existing wound rotor 100 was stripped, it was determined that the insulation used to cover the stripped conductor was rated to 26.3 volts per turn. However, since the existing wound rotor 100 was constructed using a mush, or random winding, there is no guarantee that each turn of the conductor while forming the coil would be adjacent to only the subsequent turn. As such, the insulation used to cover the stripped conductor of the existing wound rotor 100 was found to be insufficient for the nine-turn coil of the existing wound rotor 100 which has a voltage rating of 236.7 volts per coil. Accordingly, a volt per coil rating, not a volt per turn rating, is used for selecting the coil conductor insulation for the wound rotor 800. In the illustrated example of FIGS. 8-15, the conductors of the wound rotor 800 are insulated with quad film grade or inverter grade insulation to satisfy a volt per coil rating of 236.7 V. However, in other instances, other types of insulation may be used.

The designs and methods for constructing, installing, and/or refurbishing wound rotors according to the present disclosure are particularly suitable for use in wind turbine generator applications.

Various features and advantages of the aspects described herein are set forth in the following claims.

What is claimed is:

1. A wound rotor for use in an electric machine, the wound rotor comprising:

a winding overhang portion;

a connection ring formed of a plurality of rectangular cross-section conductor sections connected in parallel, the connection ring disposed underneath the winding overhang portion;

a first plurality of conductor coils extending from the winding overhang portion and directly forming a star connection with the connection ring; and a second plurality of conductor coils extending from the winding overhang portion to form a line connection.

2. The wound rotor of claim 1, wherein each of the connection ring, the first plurality of conductor coils, and the second plurality of conductor coils are individually insulated.

3. The wound rotor of claim 2, wherein each of the connection ring, the first plurality of conductor coils, and the second plurality of conductor coils are positioned below the winding overhang portion.

4. The wound rotor of claim 1, wherein the connection ring is secured to the winding overhang portion using woven glass tape.

5. The wound rotor of claim 1, wherein a total area per turn of each of the first plurality of conductor coils is less than 13 $mm^2$.

6. The wound rotor of claim 1, wherein the star connection is formed by one selected from the group consisting of brazing, tig welding, and soldering.

7. The wound rotor of claim 1, wherein ends of the conductor coils included in the second plurality are crimped and fitted with a lug; and wherein the lug is used to form a line connection via a hole formed in a shaft of the wound rotor.

8. The wound rotor of claim 1, wherein the electric machine is an induction motor and/or generator.

9. The wound rotor of claim 1, wherein the electric machine is a synchronous motor and/or generator.

10. A method for constructing a wound rotor for use in an electric machine, the method comprising:

extending a plurality of conductor coils out of a winding overhang portion;

forming a star connection directly between the plurality of conductor coils and a connection ring;

after forming the star connection, individually wrapping each one of the plurality of conductor coils with an insulating material;

after forming the star connection, wrapping the connection ring with the insulating material;

moving the wrapped connection ring to a position underneath the winding overhang portion; and securing the position of the wrapped connection ring underneath the winding overhang portion by binding the connection ring to the winding overhang portion with woven glass cloth or tape.

11. The method of claim 10, further comprising securing the connection ring to a steel support ring using woven glass tape.

12. The method of claim 10, wherein forming the star connection includes one selected from the group consisting of brazing, tig welding, and soldering.

13. The method of claim 10, wherein the plurality of conductor coils is a first plurality of conductor coils, the method further comprising forming a line connection.

14. The method of claim 13, further comprising crimping ends of the second plurality of conductor coils and fitting each of the crimped ends with a lug, wherein the lug forms a line connection via a hole formed in a shaft of the wound rotor.

15. The method of claim 10, further comprising forming the connection ring via a plurality of rectangular cross-section conductor sections connected in parallel.

16. The method of claim 10, wherein the connection ring is bound to the winding overhang portion with the woven glass cloth or tape at a plurality of separate circumferential locations.

17. A method for refurbishing an existing wound rotor for use in an electric machine, the method comprising:

at least partially disassembling the existing wound rotor to provide access to a winding overhang portion of the existing wound rotor;

extending a plurality of conductor coils out of the winding overhang portion;

forming a connection directly between the plurality of conductor coils and a connection ring;

after forming the connection, individually wrapping each one of the plurality of conductor coils with an insulating material;

after forming the connection, wrapping the connection ring with the insulating material;

repositioning the wrapped connection ring from a location outside of the winding overhang portion to a location underneath the winding overhang portion; and securing the position of the wrapped connection ring underneath the winding overhang portion by binding the connection ring to the winding overhang portion with woven glass cloth or tape.

18. The method of claim 17, further comprising replacing an existing connection ring of the existing wound rotor with the connection ring formed via a plurality of rectangular cross-section conductor sections connected in parallel, wherein wrapping the connection ring with the insulating material includes wrapping the new connection ring with the insulating material.

19. The method of claim 17, wherein the connection ring is bound to the winding overhang portion with the woven glass cloth or tape at a plurality of separate circumferential locations.

* * * * *